A. J. COLLAR.
WATER GATE VALVE.
APPLICATION FILED JUNE 4, 1909.

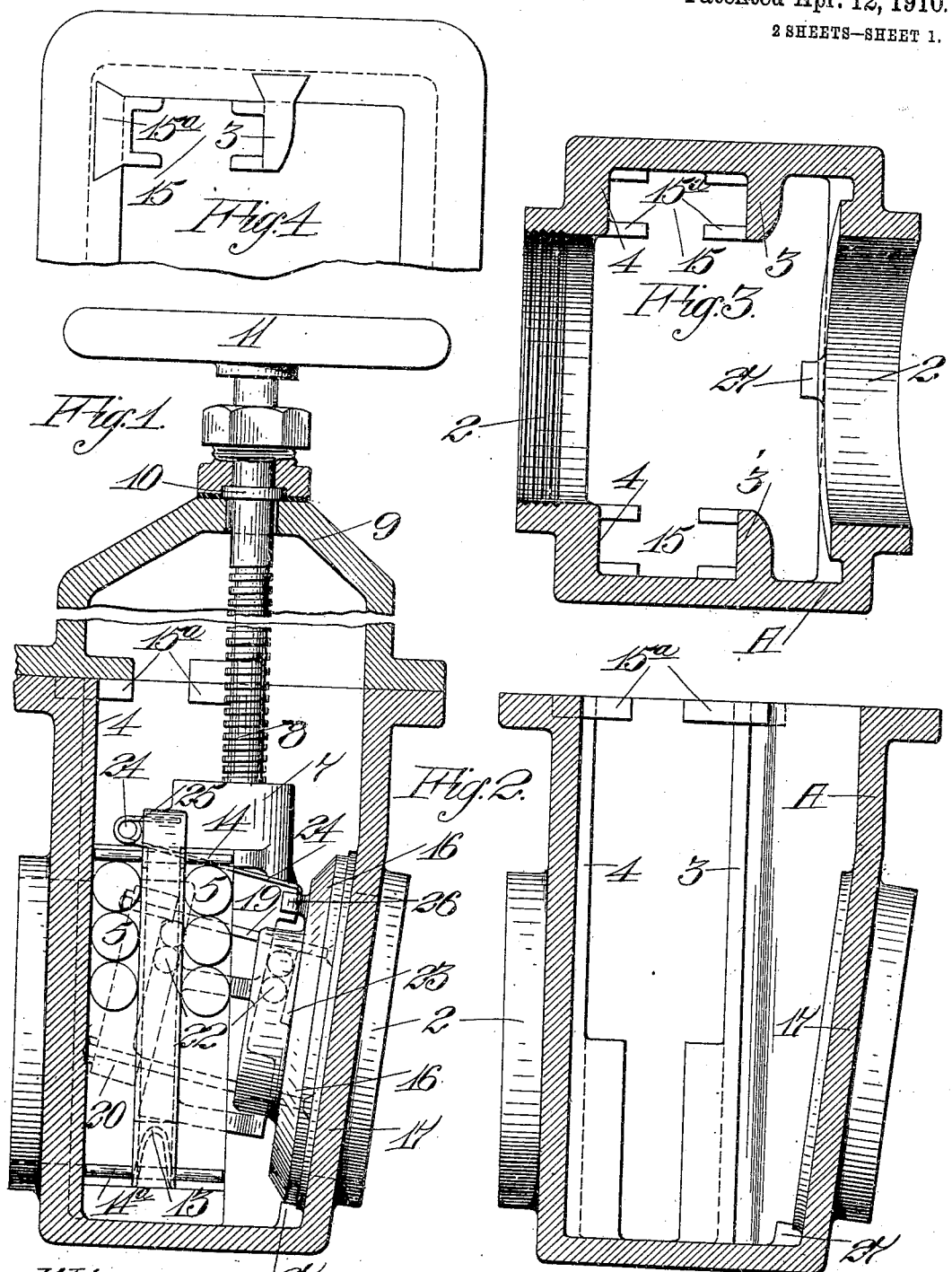

954,930.

Patented Apr. 12, 1910.
2 SHEETS—SHEET 2.

Witnesses.

Inventor.
Adoniram J. Collar
by Geo. H. Strong
his atty.

UNITED STATES PATENT OFFICE.

ADONIRAM J. COLLAR, OF YREKA, CALIFORNIA.

WATER-GATE VALVE.

954,930.

Specification of Letters Patent. Patented Apr. 12, 1910.

Application filed June 4, 1909. Serial No. 500,090.

*To all whom it may concern:*

Be it known that I, ADONIRAM J. COLLAR, citizen of the United States, residing at Yreka, in the county of Siskiyou and State of California, have invented new and useful Improvements in Water-Gate Valves, of which the following is a specification.

My invention relates to improvements in gate valves, such as are employed for controlling and regulating the flow of liquids in pipes.

It consists in the combination of parts and details of construction which will be more fully explained by reference to the accompanying drawings, in which—

Figure 5:
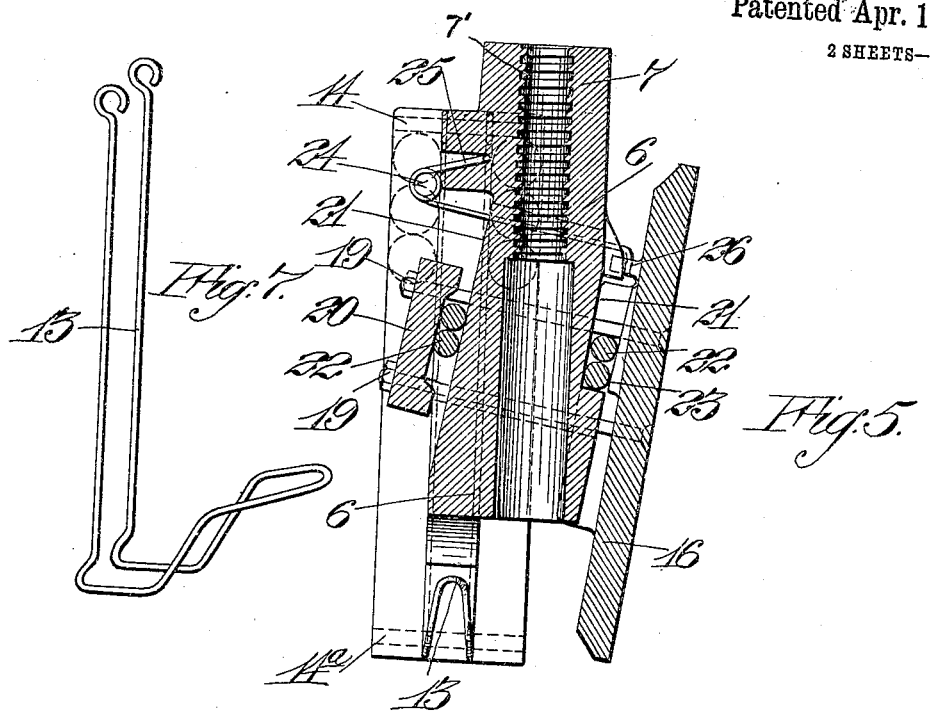
Figure 6:
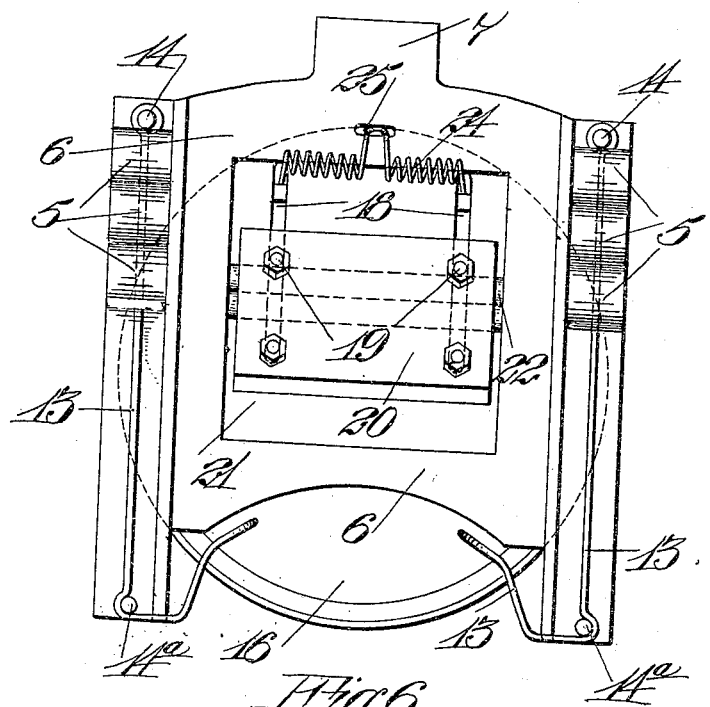

Figure 1 is a vertical section through the valve casing, showing the valve and carrier in full. Fig. 2 is a section of the lower valve casing. Fig. 3 is a cross section of Fig. 2.
Fig. 4 is a plan view of the casing, partly broken away showing the stop lugs. Fig. 5 is a section of the valve and carrier. Fig. 6 is a front elevation of same. Fig. 7 is a perspective view of one of the springs 13 detached.

It is the object of my present invention to provide a single valve or gate closable in one direction within the conduit or pipe, and having only one disk or valve, but so constructed that it will operate perfectly with water pressure from either side.

A is the casing which is fitted transversely to the pipe or conduit, and has openings 2 in the opposite sides, and in line with the pipe. The casing has vertical ribs 3 projecting from opposite sides between the front and back of the casing, and corresponding parallel surfaces 4; these surfaces forming bearings and guides for the rollers 5 between which the edges of the gate-carrier 6 are guided and movable. This gate-carrier has a central hub or block 7 perforated vertically to admit the screw-stem 8, which is turnable in a threaded portion at the upper end of the part 7. The stem extends up through a housing 9 and has a collar 10 and suitable means for preventing leakage at this point.

The screw-stem is provided with a hand-wheel 11, or equivalent means by which it can be rotated, and when so rotated, without advancing, it acts upon suitable screw threads 7', Fig. 5, in the part 7 to raise and lower the gate-carrier, and when thus raised and lowered, the edges of the carrier travel between the rollers 5, of which there are a plurality upon each side of each gate edge, and these traveling between the ribs and abutments 3 and 4 roll easily thereon, and also against the edges of the gate so that the latter may be raised and depressed without friction, and under any pressure which may be brought upon them. These rollers are maintained in position by the springs 13, the upper ends of which hook over projecting lugs 14, the springs extending downwardly and being bent at substantially right angles at the lower edges, as shown clearly in the separate view, Fig. 7; and at the lower ends these springs engage with lugs 14ª. The intermediate straight portions of the springs bear against the rollers, and thus maintain them in their proper lines of travel. The pins or lugs 14 14ª projecting at top and bottom of the grooves in which the rollers lie, form stops against which the upper or lower rollers contact to limit the movements of the gate-carrier, these movements being sufficient to allow the valve to be fully opened or closed.

Below the guide ribs 3 which occupy the upper part of the casing A, are channels formed as shown at 15, and within these channels the lugs 14ª at the bottom of the gate-carrier are guided and movable.

The gate is here shown in the form of a disk 16 closable over one of the openings through the casing, and this side of the casing is inclined as shown at 17 so that the gate will stand at an angle.

The carrier is slotted vertically as shown at 18 to allow the passage of bolts 19. These bolts pass through the disk, through the slots 18, and their opposite ends are secured to a block 20 which is upon the opposite side of the gate-carrier from the disk 16. These bolts may be headed down when in place, and the disk and block are secured together. The block stands at an angle with the casing, corresponding approximately with the angle of the gate.

The gate-carrier 6 has its surfaces cut-away on the sides adjacent to the block 20 and to the valve or gate 16, and rollers 22 are fitted into these spaces, bearing respectively against the inclined surfaces of the gate-carrier, and against the block 20 and the back of the gate itself. This gate has on its inner surface a small block 23, which is thicker at its lower than at its upper edge, and this block forms a bearing for the rollers 22 upon that side.

24 is a coiled spring, the spirals of the coils passing outwardly from the center, and the central portion having an extension 25 which engages with the upper part of the gate-carrier 6. The ends of this spring extend across through the open slots 18, and have a bearing upon lugs or attachments 26 which are fixed to the back of the valve or gate 16. The tension of this spring causes a constant downward pressure upon the valve or gate, thus holding it at its lowest point, and the rollers 22 contacting with the bottom of their containing groove or channel, limit the movement in this direction, while the rollers upon the opposite side will correspondingly limit the upward movement of the valve when it is moved with relation to the gate carrier.

Below the disk or gate 16, and fixed within the casing, is a lug or stop 27 against which the lower edge of the disk or gate contacts when the carrier is moved downwardly, for the purpose of closing the gate.

With the construction hereinbefore described, all the movable parts and the rollers, will retain their proper position, and the gate may be turned upside down without any derangement of these parts.

The operation of the gate will then be as follows: The gate being supposed to be wide open, and its carrier at its highest point, the rollers 5 will be at their highest point with relation to the casing, and the disk will be withdrawn from the inner surface of the casing as far as possible, and its lower edge raised above the transverse openings so as to allow a free flow of liquid there-through.

When it is desired to close the gate, by turning the screw 8, it will act through the threads in the part 7 to lower the gate-carrier, and with it the disk or gate will be moved downwardly until the gate reaches a position opposite its seat, meantime without any frictional contact; the rollers 5 will relieve the other moving parts of all friction, so that the movement is easily effected. When the gate arrives at the position opposite its seat, it will be arrested by contact of its lower edge with the lug 27, but still without contact with its seat. A continued downward movement of the gate-carrier by the action of the screw, will cause the rollers 22 which lie between the gate and its carrier, and between the carrier and the block 20 to roll upward on the beveled or inclined surfaces of contact, and as the carrier continues to move downwardly, the action of these inclined surfaces will force the gate away from the carrier, and close it against its seat with any desired amount of pressure. If the water pressure is from the back of the gate, this pressure will assist in closing it against its seat, but if the pressure comes against the face of the gate, the leverage on the gate is sufficient to insure its easy closing even against high pressures. When the gate is to be opened, the screw is turned from the opposite direction, and the carrier portion rises first. The gate is prevented from rising by the pressure of the ends of the spring arms 24 which pass through the slots 18 in the carrier, and as the spring has yielded when the carrier was moved down to finally close the gate, it will exert a pressure upon the gate while the carrier is rising, which pressure serves to retain the gate in its position until the carrier has risen far enough to allow the gate to be withdrawn from its seat without any sliding movement.

It will be seen that all the rollers are loose and travel freely, and as they rotate upon the two opposing surfaces, their actual travel is only half that of the faces in contact; the movement being thus equal to the diameter of the rollers plus half the space within which they travel.

A gate thus constructed is simple, can be cast and readily put together with very little machine work, and by reason of its structure and operation, has a high limit of endurance.

The rollers 5 are made of shorter length than their diameter, and may be placed in sets of three or more on each side of the gate-carrier so that there will be twelve, or more, in all of these rollers. The diameter being greater than the length insures the rollers traveling true, when the gate is opened or closed, and prevents their twisting or getting out of line.

The inclined parallel surfaces against which the rollers 22 travel, may have an angle slightly different from the angle of the gate and its seat, and this provides for a considerable increase in leverage when closing the gate.

At the top of the casing A are removable blocks 15$^a$, and these blocks correspond in position with the ribs or guides 3 so that when the gate is raised, the lugs or projections 14 may pass through the slots or channels in these lugs, which lugs serve as stops for the rollers 5, so that as the gate is raised, the lower lugs 14$^a$ will contact with the lowermost of the rollers, and the rollers will thus all be positioned between these lowermost lugs and the stops 15$^a$, and will always be properly positioned whenever the gate is opened, and in readiness to operate properly with the closing of the gate.

As the lugs 14 pass through the grooves or channels of the blocks 15$^a$, it will be seen that the parts are compact, and by allowing this portion of the gate-carrier to rise above the top of the casing in this manner, considerable space is saved.

It will be understood that when the gate is in a nearly vertical position, these parts will operate properly by gravity, but it is often necessary to reverse the apparatus, in which case the springs 13 and 24, serve by their pressure to retain the rollers and other parts in their proper relation during the operation of the device.

Having thus described my invention, what I claim and desire to secure by Letters Patent is—

1. In a water-gate, the combination of a casing interposed in the conductor, said casing having an inclined seat upon one side, a gate or valve fitting and closable upon said seat, a guided vertically slotted carrier having inclined surfaces upon opposite sides, a block 20 located upon the opposite side of the carrier from the gate, connections by which the gate and block are united, said connections extending through the slots whereby the carrier and gate are capable of independent movements.

2. In a water-gate, the combination of a casing interposed in the conductor having passages corresponding therewith, a guided carrier reciprocable within the casing, an inclined valve seat formed upon one side of the casing, a valve located upon one side of the carrier, a block upon the opposite side, said carrier having inclined surfaces corresponding with the inclined valve seat, and vertical slots made there-through, bolts connecting the valve and the block, and rollers interposed between the inclined surfaces of the carrier and the block, and the back of the valve.

3. In a water-gate, the combination of a hollow casing interposed in the conductor having passages coincident therewith, one of the sides of said casing having an inclined seat, a carrier having corresponding inclined faces upon opposite sides, a valve or gate closable upon the seat, a block upon the opposite side of the carrier with which the valve is connected to have a limited movement independent of that of the carrier, guides at opposite sides of the casing, short independent rollers fitting between said guides and the carrier, and stops against which the rollers contact to limit the movement of the carrier in each direction.

4. In a water-gate, the combination of a casing interposed in the conductor, a carrier guided and slidable therein having inclined faces upon opposite sides, an inclined seat upon one side of the casing, a gate closable thereon, a correspondingly inclined block upon the opposite side of the carrier with which the gate is loosely connected, and rollers interposed between the carrier and the gate and block respectively.

5. In a water-gate, the combination of a casing interposed in the conductor, a carrier guided and slidable therein having inclined faces upon opposite sides, an inclined seat upon one side of the casing, a gate closable thereon, a correspondingly inclined block upon the opposite side of the carrier with which the gate is loosely connected, rollers interposed between the carrier and the gate and block respectively, and a stop in the lower part of the casing by which the gate is arrested when it arrives opposite its seat.

6. In a water-gate, the combination of a casing having interior guides, a casing interposed in the conductor having passages coincident therewith, and vertically disposed guides, a carrier movable upon said guides, and having inclined faces upon opposite sides, a correspondingly inclined valve seat upon one side of the casing, a valve closable upon said seat, said valve having an inclined lug or projection upon its back, a block upon the opposite side of the carrier with which the valve is loosely connected, rollers interposed between the carrier and the block and the valve lug respectively, and a stop by which the valve is arrested when it reaches a point opposite the seat, the downward movement of said carrier being continued to force the valve against its seat.

7. In a water-gate, the combination of a hollow casing interposed in the conductor, having passages coincident therewith, and an inclined seat upon one side, and guides upon opposite interior edges, a gate closable upon the inclined seat, a loose connection between the gate and the valve, means by which the valve is normally held away from its seat while the carrier is being raised or depressed, rollers located between the inclined gate and corresponding inclined surfaces of the carrier whereby the gate is forced against its seat after reaching a position opposite thereto, other independent rollers located between the edges of the carrier and its guides, stops carried by the gate and upon the guides by which the rollers are assembled when the carrier has reached its lowest position, and lugs projecting from the carrier, and other stops fixed to the casing against which the rollers are assembled when the gate is raised to its highest point.

8. In a water-gate, the combination of a casing having vertical guides therein, stops at the lower portion of the guides and other stops removably attached to the upper part of the casing in line with the first named stops, an inclined seat, a gate closable thereon, means by which the gate is retained out of contact with its seat, while being raised and depressed, and is closed against the seat when the carrier reaches its lowest point, short rollers having greater diameter than length fitted between the edges of the gate-carrier and the guides, lugs projecting from the top and bottom of the carrier in line with the stops, and between which and the stops the rollers are located, and means whereby the carrier and gate may be raised or depressed.

9. In a water-gate, the combination of a casing interposed in the conductor having passages coincident therewith, a carrier having inclined surfaces, vertical guides between which the edges of the carrier project, a valve loosely connected with the carrier and closable against an inclined seat in one side of the casing, lugs projecting from the top and bottom of the carrier in line with the guides thereof, short rollers located between the edges of the carrier and the guide surfaces, lugs projecting from the top and bottom of the carrier in line between the guides, removable channeled stops fixed to the top of the casing, between which the lugs at the upper edges of the carrier are adapted to pass when the gate is raised, whereby the rollers are assembled at the top, and other stops in the lower part of the guides against which the rollers are assembled when the gate is closed.

10. In a water-gate, the combination with a casing, with water-passages there-through, a guided carrier, means for moving said carrier within the casing, an inclined valve-seat upon one side of the casing, correspondingly inclined surfaces upon opposite sides of the carrier, a connecting block upon the opposite side of the carrier from the gate, means by which the valve is loosely connected with the carrier, and capable of an independent movement, rollers located between the inclined surfaces of the carrier, the valve and its connecting block, and a spiral spring connecting the carrier and the valve.

11. In a water-gate, the combination of a casing with water-passages there-through, an inclined valve seat upon one side, a carrier having surfaces correspondingly inclined, a block upon the opposite side of the carrier from the gate, with which block the gate is loosely connected, rollers located between the inclined surfaces of the carrier, and those of the gate and block, guides between which the edges of the carrier project, a plurality of short rollers located between the edges of the gate and the guides, stops by which said rollers are assembled, and the movement of the carrier in each direction is arrested, and springs connecting with the stop lugs, and the upper and lower part of the carrier, between which springs and the guides, the rollers are located.

In testimony whereof I have hereunto set my hand in presence of two subscribing witnesses.

ADONIRAM J. COLLAR.

Witnesses:
C. A. TAPSCOTT,
CARRA BUSH.